(12) United States Patent
Lee et al.

(10) Patent No.: US 8,619,926 B2
(45) Date of Patent: Dec. 31, 2013

(54) CHANNEL ESTIMATING METHOD IN WIRELESS COMMUNICATION SYSTEM AND APPARATUS THEREOF

(75) Inventors: Yong Su Lee, Daejeon (KR); Young-il Kim, Daejeon (KR); Wenbo Wang, Beijing (CN); Kan Zheng, Beijing (CN)

(73) Assignee: Electronics and Telecommunications Research Institute, Daejeon (KR)

( * ) Notice: Subject to any disclaimer, the term of this patent is extended or adjusted under 35 U.S.C. 154(b) by 656 days.

(21) Appl. No.: 12/616,980

(22) Filed: Nov. 12, 2009

(65) Prior Publication Data

US 2010/0158173 A1 Jun. 24, 2010

(30) Foreign Application Priority Data

Dec. 18, 2008 (KR) ........................ 10-2008-0129438

(51) Int. Cl.
*H03D 1/04* (2006.01)
(52) U.S. Cl.
USPC ........... 375/346; 375/260; 375/295; 375/267; 375/340; 370/210
(58) Field of Classification Search
USPC ........... 375/346, 260, 295, 340, 267; 370/210
See application file for complete search history.

(56) References Cited

U.S. PATENT DOCUMENTS

| | | | |
|---|---|---|---|
| 7,869,545 B2* | 1/2011 | Liu ................................ | 375/340 |
| 2003/0108117 A1* | 6/2003 | Ketchum et al. .............. | 375/295 |
| 2006/0018411 A1 | 1/2006 | Gore et al. | |
| 2006/0067420 A1* | 3/2006 | Li et al. ......................... | 375/267 |
| 2006/0067441 A1 | 3/2006 | Park et al. | |
| 2006/0262869 A1* | 11/2006 | Yoshida ......................... | 375/260 |
| 2008/0219371 A1* | 9/2008 | Hong et al. .................... | 375/260 |
| 2010/0002574 A1* | 1/2010 | Kim et al. ...................... | 370/210 |

FOREIGN PATENT DOCUMENTS

| | | |
|---|---|---|
| JP | 2004-208254 | 7/2004 |
| JP | 2004-320677 | 11/2004 |
| JP | 2006-50253 | 2/2006 |
| KR | 10-2006-0001646 | 1/2006 |
| KR | 10-2006-0028131 | 3/2006 |

OTHER PUBLICATIONS

Richol Ku et al., "Channel Estimation Using Successive Cancellation in a Channel Having Fractionally Spaced Time Delay Paths", IEICE Technical Report RCS2005-214, Mar. 2006, pp. 217-223.

Takeshi Onizawa et al., "A Novel Channel Estimation Scheme Employing Adaptive Selection of Frequency-domain Filters for OFDM Systems", IEICE Technical Report RCS99-145, Nov. 1999, pp. 27-33.

* cited by examiner

*Primary Examiner* — Eva Puente
(74) *Attorney, Agent, or Firm* — Staas & Halsey LLP

(57) ABSTRACT

Provided is a method and system for estimating a channel in a wireless communication system. An interference coefficient is calculated based on a known structure of a pilot, and a channel value in a frequency domain is estimated. A channel value in a time domain is obtained by transforming the channel value in the frequency domain and the channel delay values are subtracted from the channel value in the time domain, thereby cancelling interference.

12 Claims, 10 Drawing Sheets

FIG. 8

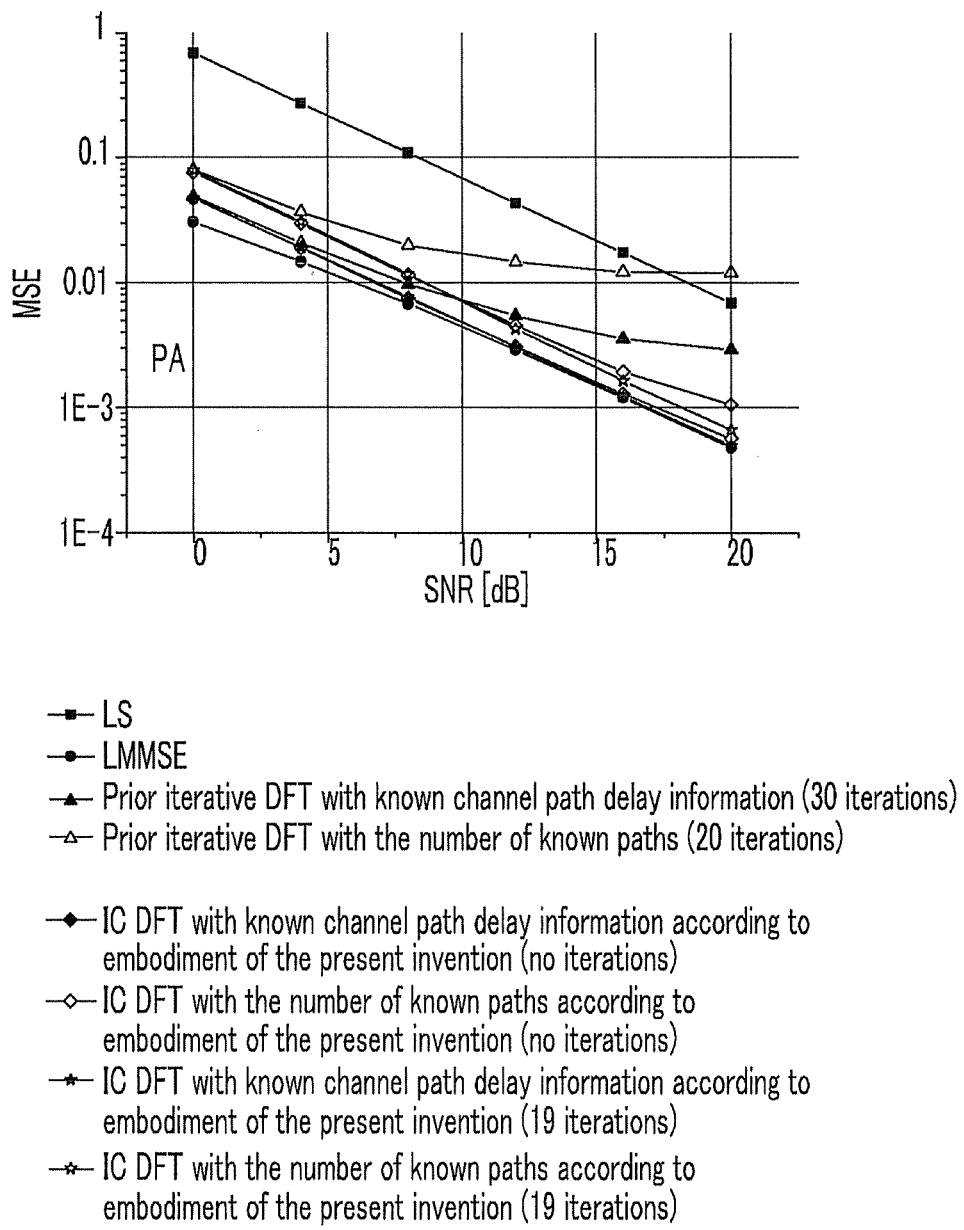

- ■- LS
- ●- LMMSE
- ▲- Prior iterative DFT with known channel path delay information (30 iterations)
- △- Prior iterative DFT with the number of known paths (20 iterations)

- ◆- IC DFT with known channel path delay information according to
  embodiment of the present invention (no iterations)
- ◇- IC DFT with the number of known paths according to
  embodiment of the present invention (no iterations)
- ✳- IC DFT with known channel path delay information according to
  embodiment of the present invention (19 iterations)
- ✳- IC DFT with the number of known paths according to
  embodiment of the present invention (19 iterations)

CHANNEL ESTIMATING METHOD IN WIRELESS COMMUNICATION SYSTEM AND APPARATUS THEREOF

CROSS-REFERENCE TO RELATED APPLICATION

This application claims priority to and the benefit of Korean Patent Application No. 10-2008-0129438 filed in the Korean Intellectual Property Office on Dec. 18, 2008, the entire contents of which are incorporated herein by reference.

BACKGROUND OF THE INVENTION (a) Field of the Invention

The present invention relates to a method for estimating channels in a wireless communication system, and an apparatus thereof.

(b) Description of the Related Art

In order to achieve coherent signal detection in a wireless communication system using a communication scheme such as orthogonal frequency division multiplexing, a receiver should know a frequency response of fading channels (called "channel frequency response" (CFR)).

Schemes for estimating a CFR include a least squares (LS) channel estimation scheme and a linear minimum mean square error (LMMSE) channel estimation scheme (LMMSE). A discrete Fourier transform (DFT)-based channel estimation scheme has been developed because of the drawbacks of these schemes.

The DFT-based channel estimation scheme obtains a channel impulse response (CIR) in a time domain by applying an inverse discrete Fourier transform (IDFT) to a CFR that is obtained based on the LS channel scheme, and performs interpolation by adding "0" to the CIR and applying a discrete Fourier transform (DFT) to the same.

In a practical communication system, direct current (DC) subcarriers are not used due to DC offset problems, and subcarriers at high frequencies are not used to avoid adjacent channel interference. These subcarriers are also called virtual subcarriers (VC).

The existence of VC means that only the LS channel estimation scheme has an effect on subcarriers in a frequency domain. Thus, the loss of channel energy in VC results in energy leakage in the time domain. Several iterative algorithms have been proposed to cope with the energy leakage problem, but all these algorithms require a block-type pilot structure.

Parts of subcarriers distributed in a downlink of a wireless communication system are not block-type pilots, but rather are comb-type pilots. If the CFR estimated by an LS algorithm using the comb-type pilots is transformed to get the CIR in the time domain, the channel energy leakage will be much more severe than that where block-type pilots are used. An iterative algorithm has been used to mitigate the negative effects caused by VC, but the number of iterations for performing processes is fairly large due to a slow convergence speed.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to enhance channel estimation performance in a wireless communication system.

Also, the present invention has been made in an effort to cancel interference in a wireless communication system.

In addition, the present invention has been made in an effort to provide a method for estimating channel base on enhanced DFT and an apparatus thereof.

An exemplary embodiment of the present invention provides a method for estimating a channel in a wireless communication system, the method including: calculating an interference coefficient based on a structure of pre-known pilots; estimating a channel value in a frequency domain for a received signal of a subcarrier; obtaining a channel value in a time domain by transforming the channel value in the frequency domain; calculating delay values based on the interference coefficient; and estimating a final channel value by subtracting the delay values from the channel value in the time domain.

Another embodiment of the present invention provides an apparatus for estimating a channel in wireless communication system. The apparatus includes a channel estimating unit for estimating a channel value in a frequency domain for a received signal of a subcarrier; an IDFT unit for obtaining a channel value in a time domain by transforming the channel value in the frequency domain; and an interference cancelling unit for calculating channel delay values based on an interference coefficient calculated with a known structure of a pilot and cancelling interference by subtracting the calculated channel delay values from the channel value in the time domain.

Yet another embodiment of the present invention provides a method for estimating a channel in a wireless communication system. The method includes: calculating an interference coefficient based on a known structure of a pilot; calculating a channel frequency response by performing least squares (LS) channel estimation on a received signal of a subcarrier; obtaining a channel impulse response in a time domain by performing inverse discrete Fourier transform (IDFT) on the channel frequency response; calculating channel delay values for each tap on a path for the received signal based on channel delay information and the interference coefficient; adding the calculated channel delay values; and cancelling interference by subtracting the channel impulse response in the time domain from the added channel delay value.

BRIEF DESCRIPTION OF THE DRAWINGS

FIG. 8 shows a result of comparing performance of the method for estimating a channel according to an exemplary embodiment of the present invention with those of the prior methods in a PA channel environment.

DETAILED DESCRIPTION OF THE EMBODIMENTS

Figure 1:
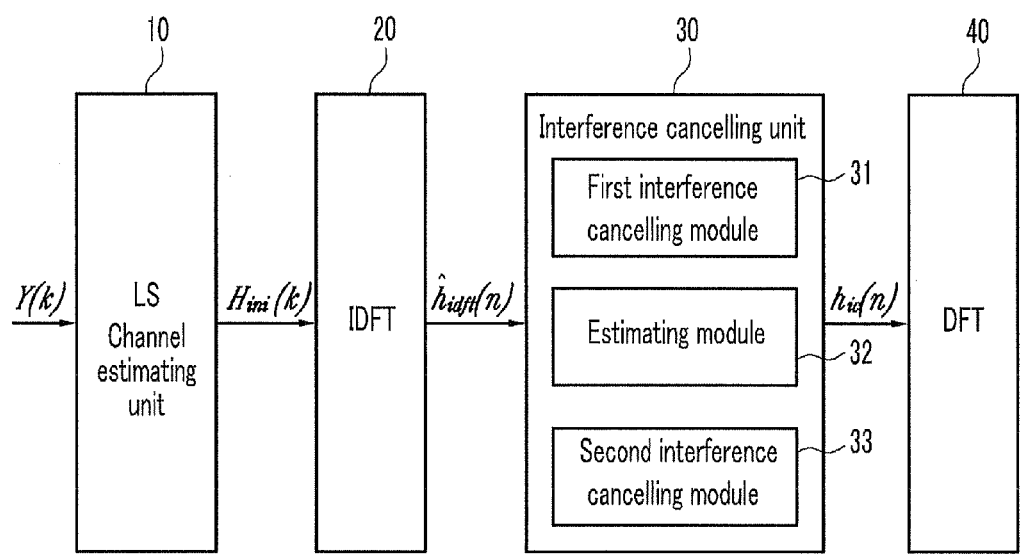
FIG. 1 shows a configuration diagram of an apparatus for estimating a channel in a wireless communication system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements.

In this specification, a mobile station (MS) may refer to a terminal, a mobile terminal (MT), a subscriber station (SS), a portable subscriber station (PSS), user equipment (UE), or an access terminal (AT). The mobile terminal may include all or part of the functions of the mobile station, the subscriber station, the portable subscriber station, and the user equipment. In this specification, a base station (BS) may refer to an access point (AP), a radio access station (RAS), a node B, a base transceiver station (BTS), or an MMR (mobile multihop relay)-BS. The base station may include all or part of the functions of the access point, the radio access station, the node B, the base transceiver station, and the MMR-BS.

Now, an exemplary embodiment of the present invention will be described in detail with reference to the accompanying drawings.

In the exemplary embodiment of the present invention, channel estimation at a receiving end is performed based on a DFT-based channel estimation scheme, and interference cancellation in a time domain is performed to prevent spreading of energy leakage.

For this purpose, in the receiving end, an estimated channel frequency response (CFR) is transformed into a channel impulse response (CIR) in a time domain by applying an inverse discrete Fourier transform (IDFT) to the same. Further, interference caused by energy leakage is calculated and the calculated interference is deleted from the CIR.

That is, after an interference coefficient is pre-calculated based on a structure of a pilot, a CIR initially estimated in a channel estimation process is transformed into a CIR in the time domain using the IDFT and interference is cancelled by subtracting the interference coefficient from the CIR in the time domain.

When path delay information of a channel is known, spread energy of taps in which delay occurs (the spread energy is also called a channel delay value) is calculated, and the spread energy of taps is cancelled from the entire CIRs. Meanwhile, when a number of channel paths is known, a simulation for estimating channel delay information for each tap.

The method and apparatus for estimating channel according to the exemplary embodiment of the present invention will be described in detail.

FIG. 1 shows a schematic structure of the apparatus for estimating a channel according to the exemplary embodiment of the present invention.

As shown in FIG. 1, the apparatus for estimating a channel according to the exemplary embodiment of the present invention includes an LS channel estimating unit 10 for estimating a CFR using an LS channel estimation scheme on a received signal to which pre-processing has been applied, an IDFT unit 20 for obtaining a CIR by performing an IDFT on the estimated CFR, an interference cancelling unit 30 for cancelling interference from the CIR, and a DFT unit 40 for interpolating the CIR from which interference is cancelled by performing a DFT on the CIR.

The interference cancelling unit 30 calculates interference coefficients based on a known structure of a pilot and uses it when cancelling interference.

Also, the interference cancelling unit 30 includes a first interference cancelling module 31 that calculates channel delay values, that is, spread energy, on each tap based on the interference coefficients when channel delay information is known, a estimation module 32 that estimates channel delay information when channel delay information is not known, and a second interference cancelling module 33 that calculates spread energy on each tap caused by the channel delay information based on the interference coefficient and cancels the spread energy from the CIR.

Here, pre-processing means processes for cancelling a cyclic prefix (CP) from the received signal, extracting preamble symbols from the received signal, compensating the received signal for timing error, and so on, after the signal is received in a receiving end (not shown in Figs.).

The method for estimating a channel according to the exemplary embodiment of the present invention will now be described.

Here, the method is performed in an orthogonal frequency division multiplexing wireless communication system as an example, and the range of the method according to the exemplary embodiment of the present invention is not restricted to the orthogonal frequency division multiplexing wireless communication system.

Figure 2:
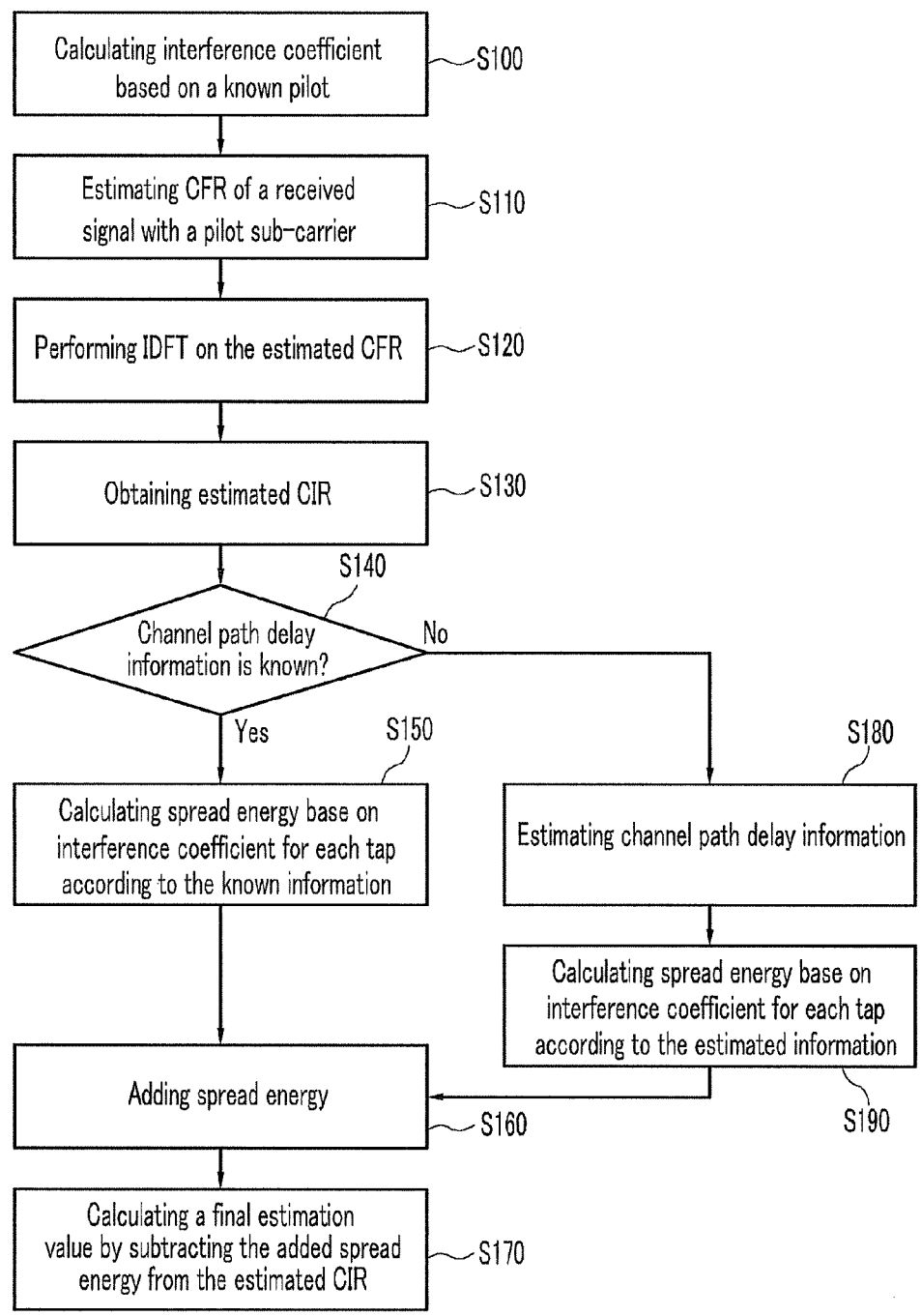
FIG. 2 shows a flowchart of a method for estimating a channel in a wireless communication system according to an exemplary embodiment of the present invention.

FIG. 2 shows a flowchart of the method for estimating a channel according to the exemplary embodiment of the present invention First, interference coefficients are pre-calculated based on structures of pilots loaded on subcarriers (S100).

It is assumed that the number of subcarriers ($\Phi_u$) that are practically used is $N_u$ when the total number of subcarriers ($\Phi_c$) that are available is N.

A CFR in a frequency domain on a received signal having a subcarrier is estimated, and a CIR in a time domain is obtained by applying an IDFT to the CFR.

When CFR in a frequency domain on a carrier is $\{H(k), k=0, 1, \ldots, N-1\}$ and CIR in a time domain on the carrier is $\{h(n), n=0, 1, \ldots, N-1\}$, energy of the CIR, that is, energy of $\{h(n)\}$ is shown in the following Equation 1.

Here, $\{h(n)\}$ has delay $\Psi_d = \{\tau_1, \tau_2, \ldots, \tau_l, \ldots, \tau_L\}$ of taps that have a total number of channel paths of L, and $\tau_l$ represents a delay of the l-th path.

$$h(n) = \begin{cases} h(n) & n = \tau_1, \tau_2, \ldots, \tau_L \\ 0 & \text{else} \end{cases} \quad \text{(Equation 1)}$$

It is assumed that {H(k)} obtained by applying a DFT to the CIR {h(n)} satisfying Equation 1.

If comb-type pilots are disposed in a downlink of a wireless communication system (e.g., the comb-type is used when allocating FUSC sub-channels in a Wibro system), CFR on a subcarrier $\Phi_P$ in which the pilots are disposed is estimated, and the estimated CFR $H_{pilot}(k)$ is shown as in the following Equation 2.

$$H_{pilot}(k) = \begin{cases} H(k) & k \in \Phi_p \\ 0 & \text{else} \end{cases} \quad \text{(Equation 2)}$$

CIR $h_{pilot}(n)$, which is shown as in the following Equation 3, is obtained by transforming the CFR $H_{pilot}(k)$ into the time domain.

$$\begin{aligned} h_{pilot}(n) &= \frac{1}{N} \sum_{k=0}^{N-1} H_{pilot}(k) e^{j2\pi nk/N} \quad \text{(Equation 3)} \\ &= \frac{1}{N} \sum_{k \in \Phi_p} H(k) e^{j2\pi nk/N} \\ &= \frac{1}{N} \sum_{k \in \Phi_p} \left( \sum_{t=0}^{N-1} h(t) e^{-j2\pi tk/N} \right) e^{j2\pi nk/N} \\ &= \frac{1}{N} \sum_{t=0}^{N-1} h(t) \left( \sum_{k \in \Phi_p} e^{-j2\pi(t-n)k/N} \right) \\ &= \frac{N_P}{N} h(n) + \sum_{\substack{t=0 \\ t \neq n}}^{N-1} h(t) \left( \frac{1}{N} \sum_{k \in \Phi_p} e^{-j2\pi(t-n)k/N} \right) \\ &= h(n) c(n,n) + \sum_{\substack{t=0 \\ t \neq n}}^{N-1} h(t) c(n,t) \end{aligned}$$

A first part of the CIR $h_{pilot}(n)$ that is obtained on the subcarrier of the comb-type pilot structure is remaining energy (hereinafter called first energy) of h(n) with a coefficient c(n,t), and a second part of the CIR $h_{pilot}(n)$ is spread energy (hereinafter called second energy) that is caused by h(t), t≠n of a c(n,t) coefficient.

Since the value of the second energy is smaller than the value of the first energy, the second energy is considered interference. The coefficients of the second energy considered interference, that is, interference coefficients c(n,t), may be calculated based on the pilot structure as in the following Equation 4.

$$c(n,t) = \frac{1}{N} \sum_{k \in \Phi_p} e^{-j2\pi(t-n)k/N} \quad \text{(Equation 4)}$$

The calculated interference coefficients will be used in the interference cancellation unit 30.

After the interference coefficients are calculated in advance as described above, channel estimation on signals that are actually received is performed as follows.

Channel values of sub-channels in which pilots are positioned are estimated. A received signal Y(k) of a k-th subcarrier may be shown as in the following Equation 5.

$$Y(k) = X(k) \cdot H(k) + N(k), k \in \Phi_u \quad \text{(Equation 5)}$$

Herein, X(k) represents a transmitted signal, N(k) represents additive white Gaussian noise (AWGN) of the k-th subcarrier, the average value of the AWGN is "0", and the dispersion value of the AWGN is $\sigma^2$.

The channel values of sub-channels may be obtained as in the following Equation 6 based on the LS channel estimation scheme that divides symbols of the received signal by pilot symbols, wherein the pilot symbols are known.

$$H_{ls}(k) = Y(k)/X(k), k \in \Phi_P \quad \text{(Equation 6)}$$

Herein, $H_{ls}(k)$ represents the channel values, that is, the CFR of the received signal obtained according to the LS channel estimation scheme.

Since the LS channel estimation scheme is known to a person skilled in the art, a detailed description thereof will be omitted.

After obtaining the CFR as described above, the LS channel estimating unit 10 calculates estimation channel values CFR on effective channel intervals that have an initial effective channel length in a frequency domain of a pilot subcarrier by adding "0" to subcarriers (also called non-pilot subcarriers) that have a data symbol (S110). The estimation channel values CFR on effective channel intervals are shown in the following Equation 7.

$$H_{ini}(k) = \begin{cases} H_{ls}(k) & k \in \Phi_p \\ 0 & k \in \Phi_c - \Phi_p \end{cases} \quad \text{(Equation 7)}$$

As shown in Equation 7, after substituting values of intervals except for the effective channel intervals with 0, CIR is estimated by transforming the channel values CFR on effective channel intervals, which have the initial effective channel length, to the time domain by an N-point IDFT (S120-S130). The estimated CIR is shown in the following Equation 8.

$$\{h_{idft}(n), n=0,1,\ldots,N-1\} = \text{IDFT}\{H_{ini}(k), k \in \Phi_c\} \quad \text{(Equation 8)}$$

Next, when the estimated CIR $\{h_{idft}(n)\}$ including noise is multiplied by a brick wall window of length $M_P$ and then truncated. CIR as in the following Equation 9 is obtained.

$$\hat{h}_{idft}(n) = \begin{cases} h_{idft}(n) & n \in \{0, 1, \ldots, M_P - 1\} \\ 0 & \text{else} \end{cases} \quad \text{(Equation 9)}$$

After obtaining the truncated CIR, interference cancellation is performed in consideration of the following cases.

A first case is a case in which channel path delay information $\Psi_d$ is known (S130-S140).

In the first case, the first interference cancelling module 31 calculates delay spread energy for taps of which delay information is known on the basis of the pre-calculated interference coefficient c(n,t) according to Equation 3, and the calculated delay spread energy for taps is added (S160).

Finally, channel estimation values $h_{ic}(n)$ from which interference is cancelled is obtained by subtracting the added delay spread energy from the truncated CIR $\hat{h}_{idft}(n)$ (S170).

These processes are as in the following Equation 10.

$$c'(n, \tau_l) = \begin{cases} c(n, \tau_l)/c(\tau_l, \tau_l) & n = 0, 1, \ldots, \tau_l - 1, \\ & \tau_l + 1, \ldots, M_p - 1 \\ 0 & n = \tau_l \end{cases}$$ (Equation 10)

$$h_{spread}(n, l) = \hat{h}_{idft}(\tau_l) \cdot c'(n, \tau_l) \quad l = 1, 2, \ldots, L$$

$$h_{ic}(n) = \begin{cases} \left( \hat{h}_{idft}(n) - \sum_{l=1}^{L} h_{spread}(n, l) \right) \Big/ c(\tau_l, \tau_l) & n \in \Psi_d \\ 0 & \text{else} \end{cases}$$

Here, c'(n, $\tau_l$) represents an interference coefficient of a tap, and $h_{spread}$(n,l) represents delay spread energy of a tap.

A second case is a case in which the channel path delay information $\Psi_d$ is unknown.

In the second case, the estimation module 32 of the interference cancelling unit 30 estimates channel path delay information $\Psi_d$ (S180).

Figure 3:
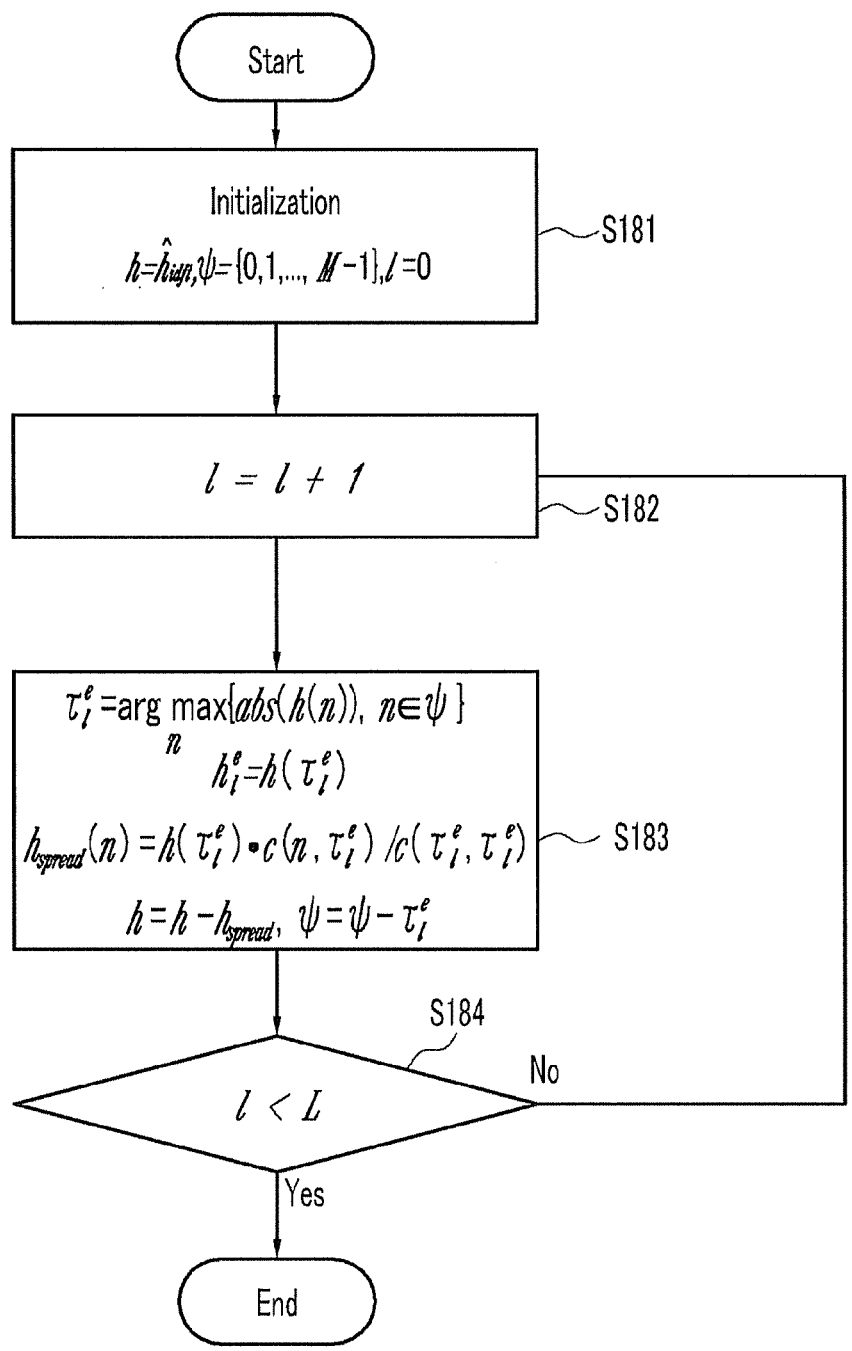
FIG. 3 shows a flowchart of a process for estimating channel path delay information according to an exemplary embodiment of the present invention.

FIG. 3 shows a flowchart of a channel path delay information estimation process according to an exemplary embodiment of the present invention.

As shown in FIG. 3, firstly, parameters for calculating the channel path delay information (S181) are determined.

The channel path delay information is estimated by performing a delay information estimation process as in the following Equation 11 as many times as the number of the entire channel paths L (S182-S184).

$$\tau_l^e = \underset{n}{\operatorname{argmax}}\{abs(h(n)), n \in \Psi\}$$ (Equation 11)

$$h_l^e = h(\tau_l^e)$$

$$h_{spread}(n) = h(\tau_l^e) \cdot c(n, \tau_l^e)/c(\tau_l^e, \tau_l^e)$$

$$h = h - h_{spread}, \Psi = \Psi - \tau_l^e$$

After the channel path delay information is estimated, the second interference cancelling module 33 calculates delay spread energy for each estimated tap $\tau_l^e$(l=1, 2, ..., L) with the pre-calculated interference coefficient c(n,t) on the basis of the estimated channel path delay information as shown in FIG. 3 (S190), and adds the delay spread energy of the estimated taps.

The second interference cancelling module 33 obtains a channel estimate value $h_{ic}$(n) from which interference is cancelled by subtracting the added delay from the truncated CIR $\hat{h}_{idft}$(n) (S160, S170).

These processes are as in the following Equation 12.

$$c'(n, \tau_l^e) = \begin{cases} c(n, \tau_l^e)/c(\tau_l^e, \tau_l^e) & n = 0, 1, \ldots, \tau_l^e - 1, \\ & \tau_l^e + 1, \ldots, M_p \\ 0 & n = \tau_l^e \end{cases}$$ (Equation 12)

$$h_{spread}(n, l) = h_l^e \cdot c'(n, \tau_l^e) \quad l = 1, 2, \ldots, L$$

$$h_{ic}(n) = \begin{cases} \left( \hat{h}_{idft}(n) - \sum_{l=1}^{L} h_{spread}(n, l) \right) \Big/ c(\tau_l^e, \tau_l^e) & n \in \Psi_{est} \\ 0 & \text{else} \end{cases}$$

Here, c'(n,$\tau_l^e$) represents an interference coefficient of an estimated tap, and $h_{spread}$(n,l) represents delay spread energy of a estimated tap.

The channel estimation value from which interference is cancelled is finally obtained through the above-described processes.

In order to evaluate performance of the channel estimating apparatus and method according to the exemplary embodiments of the present invention, the following simulation was performed.

The simulation was held for an orthogonal frequency division multiplexing communication system, and basic parameters used in the simulation are as shown in the following Table 1.

TABLE 1

| PARAMETER | VALUE |
| --- | --- |
| Frequency band | 2.3 GHz |
| Channel bandwidth | 8.75 MHz |
| Sampling frequency | 10 MHz |
| Symbols in a frame | 27 symbols (data symbols 24, preamble symbols 3) |
| FFT size | 1024 |
| Ratio of CP | 1/8 |
| Subcarrier allocation | FUSC |
| Antenna configuration | Base station: 1, mobile station: 1 |

The following Table 2 represents a subcarrier allocation pattern of the communication system applied to the simulation.

An allocation pattern of subcarriers used in a full usage of sub-channels (FUSC) of a downlink is instanced.

TABLE 2

| Parameter | Value | Comments |
| --- | --- | --- |
| Number of DC subcarriers | 1 | Index 512 |
| Number of left guard subcarriers | 87 | |
| Number of right guard subcarriers | 86 | |
| Number of used subcarriers | 851 | Number of all subcarriers used within a symbol, including all possible allocated pilots and the DC subcarrier |
| Pilots | | |
| Variable set #0 | 36 | 0, 24, 48, 72, 96, 120, 144, 168, 92, 216, 240, 264, 288, 312, 336, 360, 384, 408, 432, 456, 480, 504, 528, 552, 576, 600, 624, 648, 672, 696, 720, 768, 792, 816, 840 |
| Constant set #0 | 6 | 72 * (2 * n + k) + 9 where k = 0 and n = 0, ..., 5 DC subcarrier should be included when the pilot |

TABLE 2-continued

| | Value | Comments |
|---|---|---|
| | | subcarrier index is calculated by the equation |
| Variable set #1 | 35 | 36, 108, 180, 252, 324, 396, 468, 540, 612, 684, 756, 828, 12, 84, 156, 228, 300, 372, 444, 516, 588, 660, 732, 804 60, 132, 204, 276, 348, 420, 492, 564, 636, 708, 780 |
| Constant #1 | 5 | 72 * (2 * n + k) + 9 where k = 1 and n = 0, . . . , 4 DC subcarrier should be included when the pilot subcarrier index is calculated by the equation. |
| Number of data subcarriers | 768 | |

Figure 4:
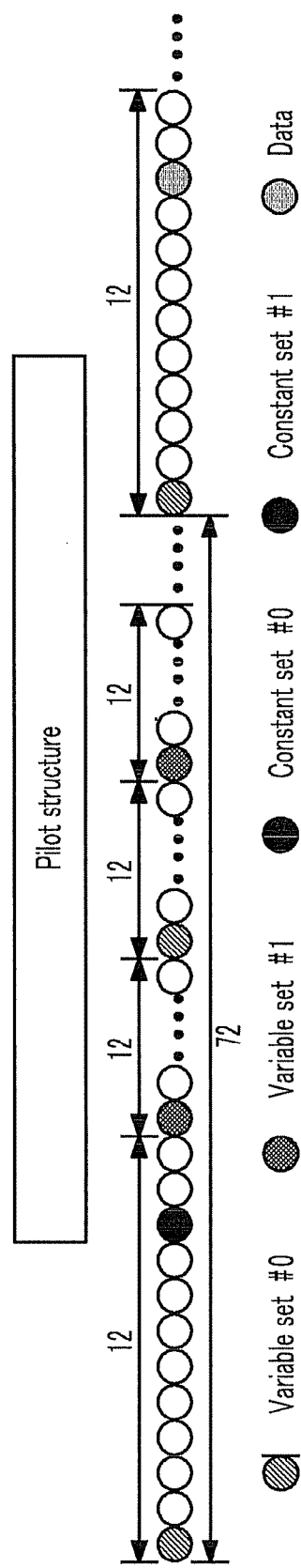
FIG. 4 shows an example of a structure of a pilot according to an exemplary embodiment of the present invention.

A structure of a pilot that has the allocation pattern and is used in the simulation is as shown in FIG. 4.

FIG. 4 shows an example of the structure of a pilot according to an exemplary embodiment of the present invention.

The following results are obtained by applying the channel estimating method according to an exemplary embodiment of the present invention to a receiving end in a wireless communication that has the above-described parameters and allocation pattern.

FIG. 5 to FIG. 10 show the results of performance comparison between the channel estimation according to the exemplary embodiment of the present invention and prior methods.

Figure 5:
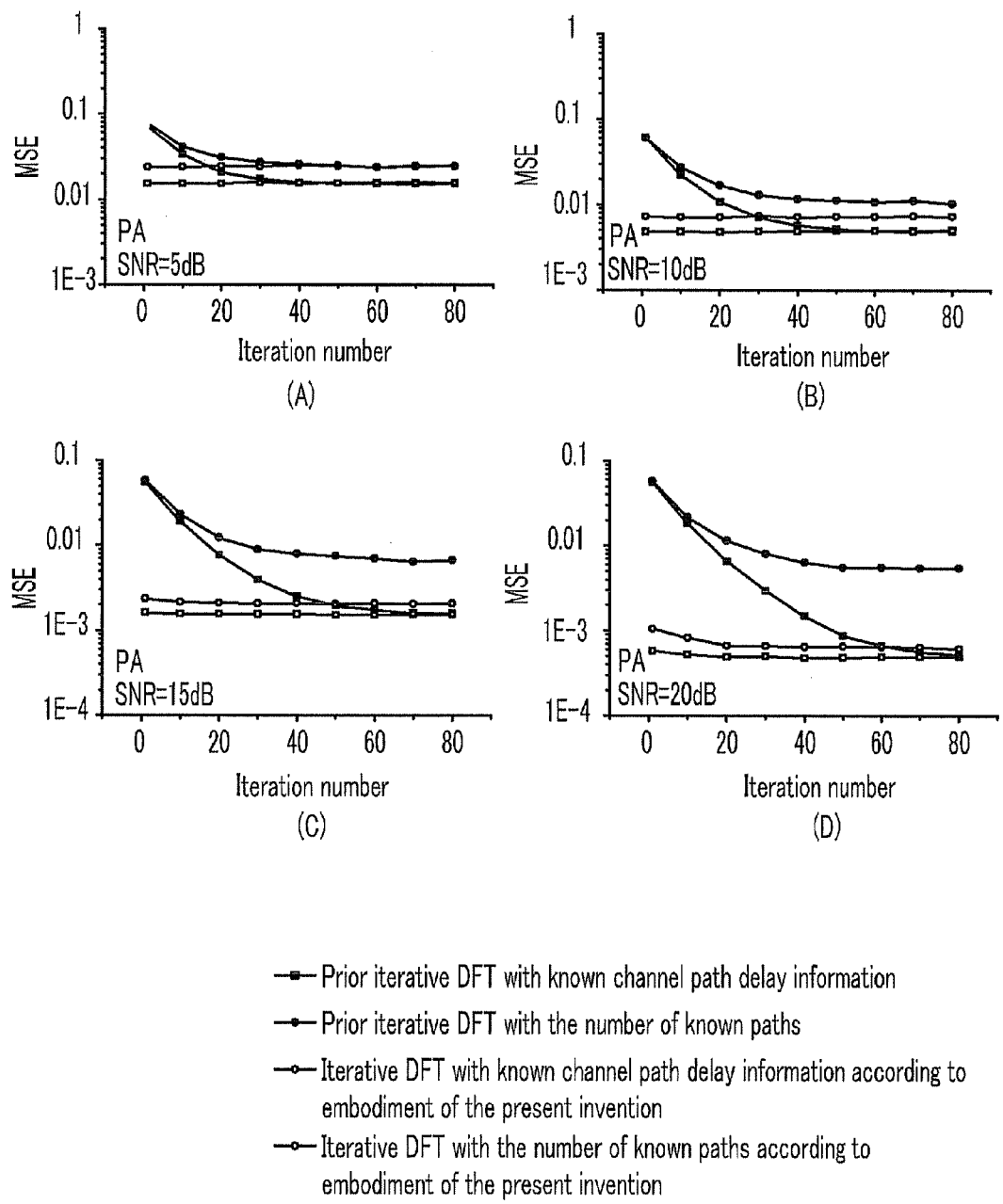
FIG. 5 shows MSE performance depending on a number of iterations in the method for estimating a channel according to an exemplary embodiment of the present invention in a pedestrian-A (PA) channel environment.
Figure 6:
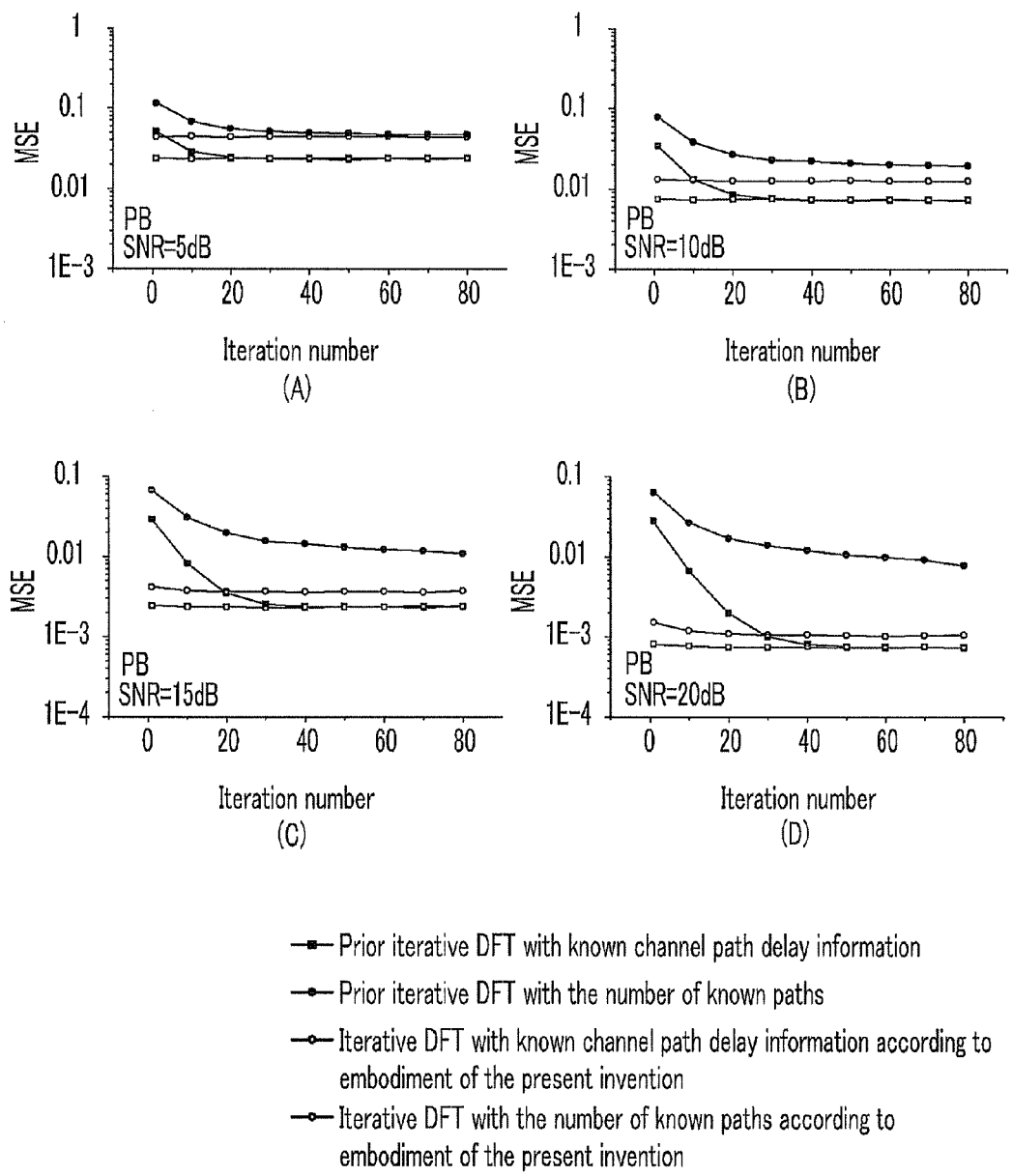
FIG. 6 shows MSE performance depending on a number of iterations in the method for estimating channel according to an exemplary embodiment of the present invention in a pedestrian-A (PB) channel environment.
Figure 7:
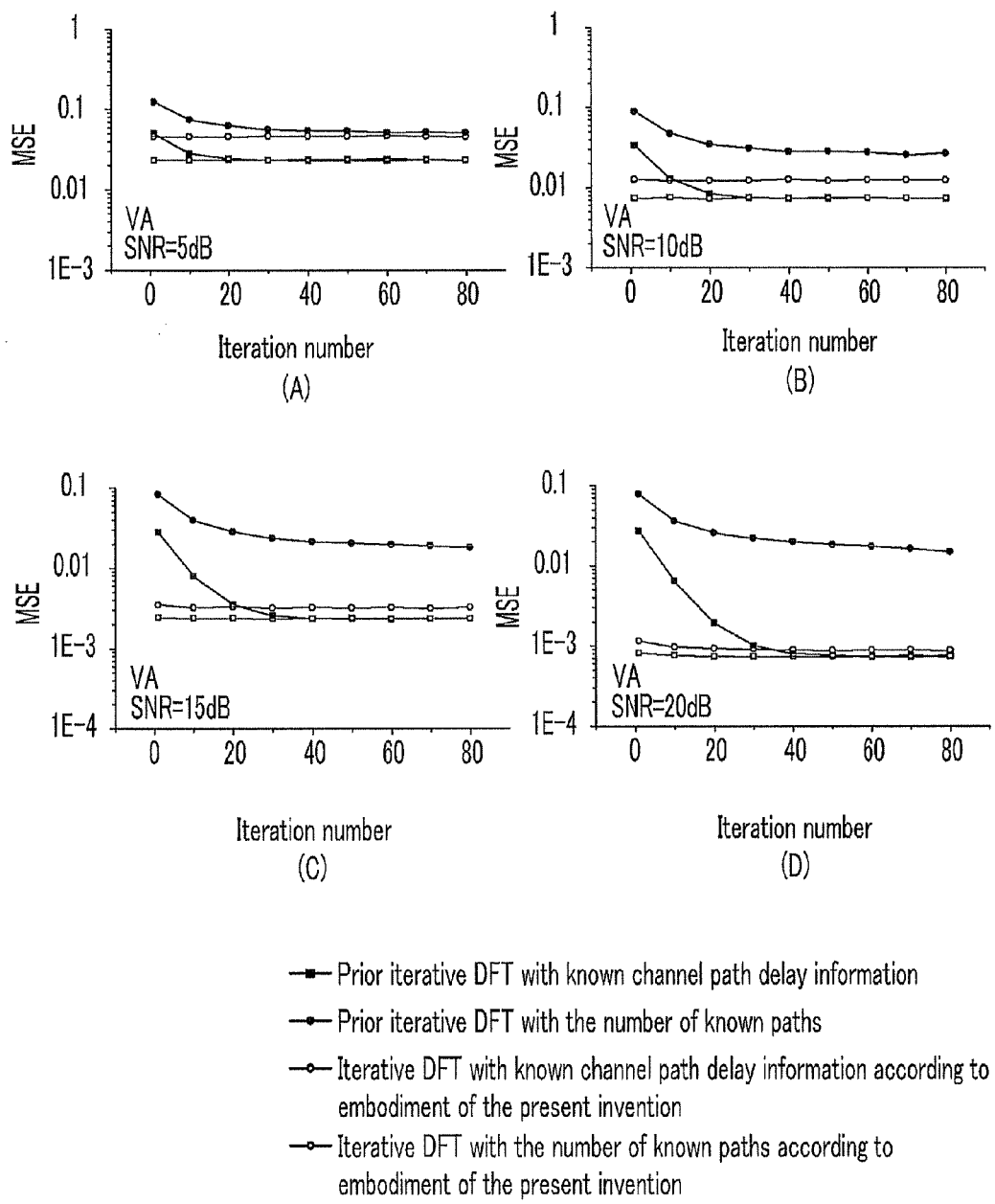
FIG. 7 shows MSE performance depending on a number of iterations in the method for estimating channel according to an exemplary embodiment of the present invention in a vehicular-A (VA) channel environment.

Particularly. FIG. 5 to FIG. 7 shows mean square error (MSE) performance versus iteration number in a plurality of channel environments.

The channel environments includes a pedestrian-A (PA) channel environment, a pedestrian-B (PB) channel environment, and a vehicular-A (VA) channel environment. In the pedestrian-A (PA) channel environment and the pedestrian-B(PB) channel environment, users having a mobile station move on foot. In the vehicular-A (VA) channel environment, users having a mobile station move by vehicles.

Referring to FIG. 5 to FIG. 7, from the simulation results, the number of iterations needed for performance convergence in a prior iterative DFT-based algorithm is fairly large, especially in a high signal-to-noise ratio (SNR) situation. Moreover, the performance of an iterative DFT-based algorithm with unknown path delay information deteriorates severely as SNR increases.

However, the channel estimating method according to the exemplary embodiment of the present invention, that is, the iterative DFT-based interference cancelation method, needs a smaller number of iterations in comparison with the prior iterative DFT-based algorithm, and achieves the same or better performance.

Figure 9:
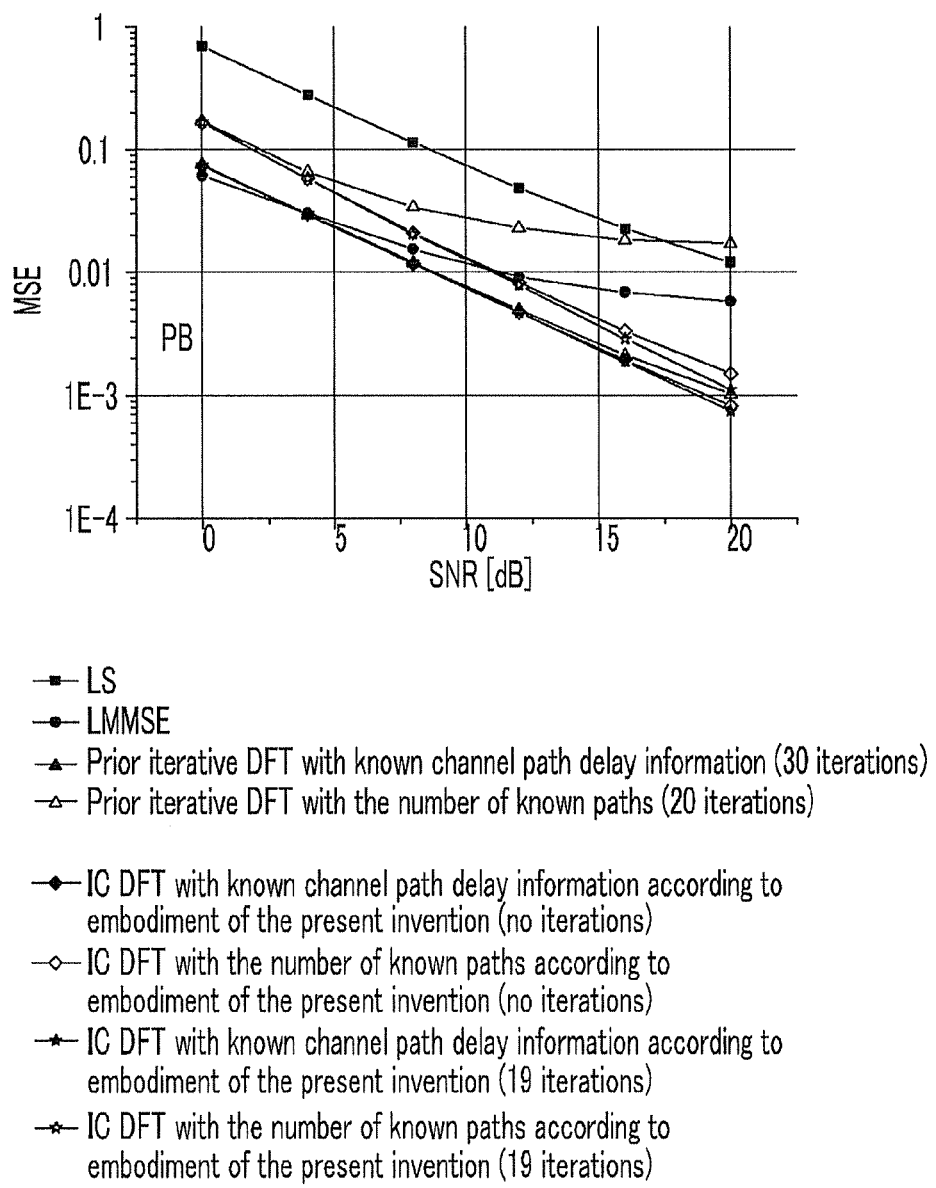
FIG. 9 shows a result of comparing performance of the method for estimating a channel according to an exemplary embodiment of the present invention with those of the prior methods in a PB channel environment.
Figure 10:
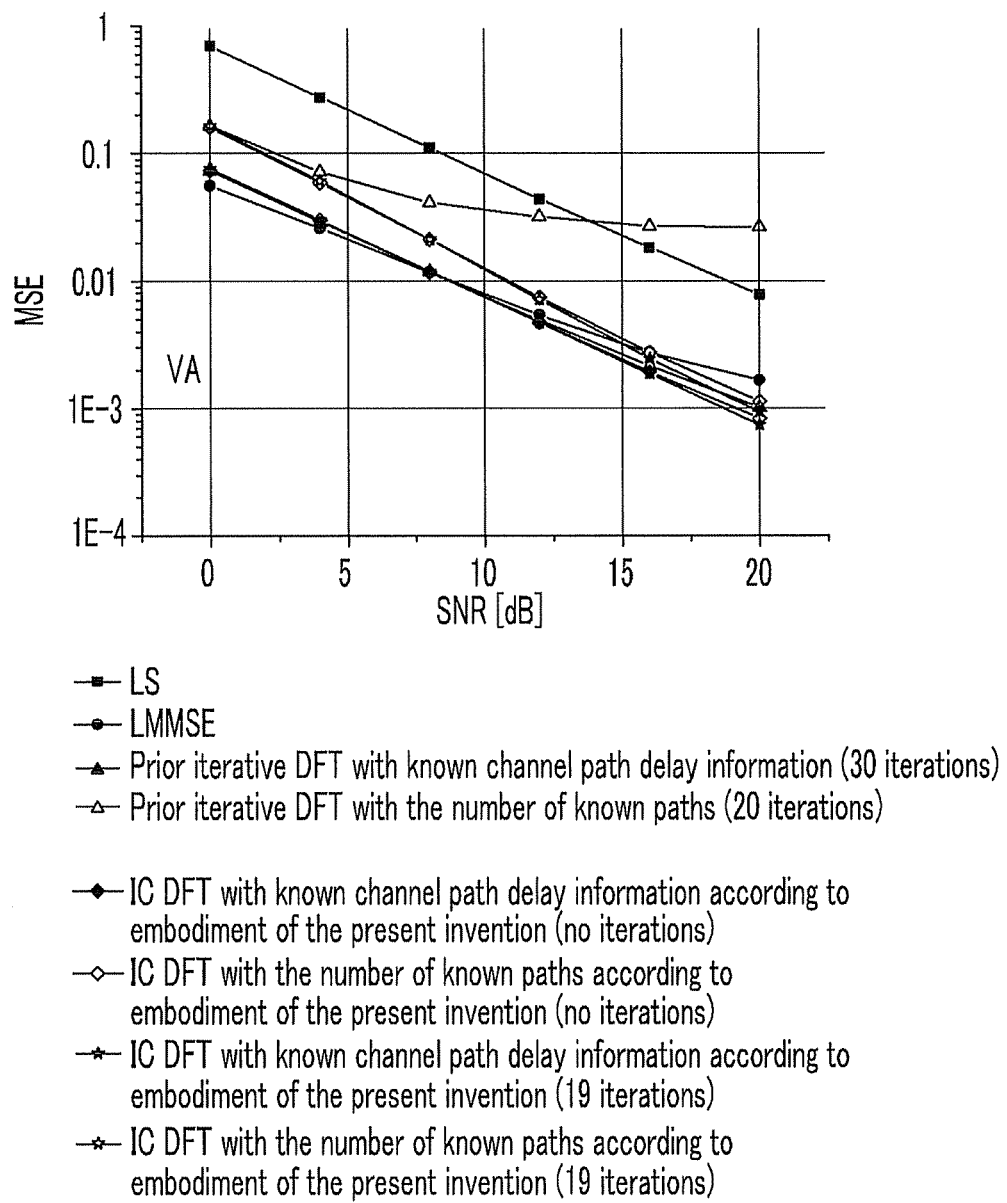
FIG. 10 shows a result of comparing performance of the method for estimating a channel according to an exemplary embodiment of the present invention with those of the prior methods in a VA channel environment.

Further. FIG. 8 to FIG. 10 show mean square error (MSE) performance in the plurality of channel environments.

More specifically, FIG. 8 to FIG. 10 are respectively graphs showing MSE performance comparison of the DFT-based interference cancelation channel estimating method according to the exemplary embodiment of the present invention and the prior methods of an LS channel estimation, an LMMSE channel estimation, and an iterative DFT-based channel estimation in the pedestrian-A (PA) channel environment, the pedestrian-B (PB) channel environment, and the vehicular-A (VA) channel environment, respectively.

Referring to FIG. 8 to FIG. 10, it is known that the LMMSE channel estimation is not appropriate in a practical communication system because a power delay profile should be known and inverse matrixes should be calculated in the LMMSE channel estimation. Meanwhile, it is known that the DFT-based interference cancelation channel estimating method according to the exemplary embodiment of the present invention has excellent MSE performance regardless of whether channel path delay information is known.

The following Tables 3 and 4 show complexity comparison of the channel estimating method of the exemplary embodiment of the present invention and the prior channel estimating methods.

Table 3 shows complexity according to processes of each method.

TABLE 3

| Process | Complexity |
|---|---|
| N-point DFT/IDFT | (N/2) * $\log_2$ N |
| IC in time domain | 2 * $\tau_{max}$ * L |
| N × N Matrix inversion | 27 * $N^3$ + $N^2$ |
| Matrix multiplication of M × P and P × N | M * N * (2 * P − 1) |

Table 4 shows complexity according to algorithms of each method.

TABLE 4

| Algorithm | Considered Operations | Complexity | N = 1024, L = 6, $N_p$ = 82, $M_p$ = 84 |
|---|---|---|---|
| LMMSE | Matrix inversion Matrix multiplication | 27 * $N_p^3$ + 3 * $N_p^2$ − $N_p$ | 1.5 × $10^7$ |
| Prior iterative algorithm with known channel path delay information (30 iterations) | DFT/IDFT transformation | 30 * N * $\log_2$ N | 3 * $10^5$ |
| Prior iterative algorithm with unknown channel path delay | DFT/IDFT transformation | 20 * N * $\log_2$ N | 2 * $10^5$ |

TABLE 4-continued

| Algorithm | Considered Operations | Complexity | N = 1024, L = 6, $N_p = 82$, $M_p = 84$ |
|---|---|---|---|
| information (20 iterations) | | | |
| DFT-based IC algorithm with known channel path delay information | IC in the TD DFT/IDFT transformation | $N * \log_2 N + 2 * M_p * L$ | $1.1 * 10^4$ |
| DFT-based IC algorithm with unknown channel path delay information | IC in the TD DFT/IDFT transformation | $N * \log_2 N + 4 * M_p * L$ | $1.2 * 10^4$ |

Referring to Tables 3 and 4, it is distinctly shown that the channel estimating method (the iterative DFT-based interference cancellation method) according to the exemplary embodiment of the present invention has excellent estimation performance with low complexity.

According to the embodiments of the present invention, it is possible to correctly estimate a channel value through processes with low complexity. Also, the number of iterations for performing channel estimation can be decreased and excellent channel estimation performance can be obtained.

The above-described embodiments can be realized through a program for realizing functions corresponding to the configuration of the embodiments or a recording medium for recording the program in addition to through the above-described device and/or method, which is easily realized by a person skilled in the art. While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for estimating a channel in a wireless communication system, the method comprising:
   calculating an interference coefficient based on a known structure of a pilot prior to receiving a signal;
   estimating a channel value of the received signal having a subcarrier in a frequency domain;
   obtaining a channel value in a time domain by transforming the channel value from the frequency domain;
   calculating channel delay values based on the calculated interference coefficient; and
   estimating a final channel value by subtracting the calculated channel delay values from the channel value in the time domain.

2. The method of claim 1, wherein, when channel delay information on a path for the received signal is known, the calculating channel delay values includes:
   calculating channel delay values corresponding to spread energy based on the channel delay information and the interference coefficient for each tap on the path; and
   adding the calculated channel delay values.

3. The method of claim 1, wherein, when channel delay information on a path for the received signal is unknown, the calculating channel delay values includes:
   estimating the channel delay information on the path;
   calculating channel delay values corresponding to spread energy based on the estimated channel delay information and the interference coefficient for each tap on a path when the channel delay information on the path for the received signal is known; and
   adding the calculated channel delay values.

4. The method of claim 1, wherein
   the estimating the channel value in the frequency domain includes calculating a channel frequency response by performing least squares (LS) channel estimation on the received signal of a subcarrier, and
   the obtaining a channel value in the time domain includes obtaining a channel impulse response in the time domain by performing inverse discrete Fourier transform (IDFT) on the channel frequency response.

5. The method of claim 4, wherein
   the estimating the channel value in the frequency domain further includes calculating a channel frequency response for an initial effective interval from the calculated channel frequency response, and
   the obtaining the channel value in the time domain includes obtaining the channel impulse response based on the channel frequency response for the initial effective interval.

6. The method of claim 1, wherein
   the calculating the interference coefficient includes:
   obtaining the channel impulse response in the time domain by calculating the channel estimation value in the frequency domain for a signal of a subcarrier that has a known structure and then transforming the channel estimation value to the time domain; and
   setting a spread energy of the obtained channel impulse response as interference and calculating an interference coefficient according to the interference.

7. An apparatus for estimating a channel in a wireless communication system, the apparatus comprising:
   a calculating unit calculating an interference coefficient based on a known structure of a pilot prior to receiving a signal;
   a channel estimating unit estimating a channel value in a frequency domain for a received signal of a subcarrier;
   an IDFT unit obtaining a channel value in a time domain by transforming the channel value from the frequency domain; and
   an interference cancelling unit calculating channel delay values based on the calculated interference coefficient and cancelling interference by subtracting the calculated channel delay values from the channel value in the time domain.

8. An apparatus for estimating a channel in a wireless communication system, the apparatus comprising:
   a channel estimating unit for estimating a channel value in a frequency domain for a received signal of a subcarrier;

an IDFT unit for obtaining a channel value in a time domain by transforming the channel value from in the frequency domain; and an interference cancelling unit for calculating channel delay values based on an interference coefficient calculated with a known structure of a pilot and cancelling interference by subtracting the calculated channel delay values from the channel value in the time domain, wherein the interference cancelling unit includes:

a first interference cancelling module that calculates channel delay values for each tap on a delay path based on an interference coefficient when delay information of the received signal is known and subtracts the channel delay values from the channel value in the time domain;

an estimating module that estimates the channel delay information of the received signal when the delay information is unknown; and a second interference cancelling module that calculates channel delay values for each tap on a delay path based on the estimated channel delay information and subtracts the channel delay values from the channel value in the time domain.

9. The apparatus of claim 7, further including a DFT unit that transforms channel values from the time domain into the frequency domain by performing discrete Fourier transform (DFT) on the channel values in the time domain.

10. A method for estimating a channel in a wireless communication system, the method comprising:

calculating an interference coefficient based on a known structure of a pilot prior to receiving a signal;

calculating a channel frequency response by performing least squares (LS) channel estimation of a received signal of a subcarrier;

obtaining a channel impulse response in a time domain by performing inverse discrete Fourier transform (IDFT) on the channel frequency response;

calculating channel delay values for each tap on a path for the received signal based on channel delay information and the interference coefficient;

adding the calculated channel delay values; and cancelling interference by subtracting the channel impulse response in the time domain from the added channel delay value.

11. The method of claim 10, further including estimating the channel delay information when the channel delay information on a path for the received signal is unknown.

12. A method for estimating a channel in a wireless communication system, the method comprising:

calculating an interference coefficient based on a known structure of a pilot, prior to receiving a signal;

estimating a channel value of the received signal having a subcarrier in a frequency domain;

obtaining a channel value in a time domain by transforming the channel value from the frequency domain;

calculating channel delay values for each tap on a delay path based on the interference coefficient when delay information of the received signal is known and cancelling interference by subtracting the channel delay values from the channel value in the time domain;

estimating channel delay information of the received signal when the delay information is unknown; and calculating channel delay values for each tap on a delay path based on the estimated channel delay information and cancelling interference by subtracting the channel delay values from the channel value in the time domain.

* * * * *